(12) United States Patent
Olbrich et al.

(10) Patent No.: US 6,314,908 B1
(45) Date of Patent: Nov. 13, 2001

(54) POINTER INSTRUMENT

(75) Inventors: Helmut Olbrich, Darmstadt; Hans Kolibius, Babenhausen; Heinrich Noll, Gross-Umstadt; Stephan Zech, Eltville, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/171,141

(22) PCT Filed: Mar. 19, 1997

(86) PCT No.: PCT/EP97/01381

§ 371 Date: Feb. 1, 1999

§ 102(e) Date: Feb. 1, 1999

(87) PCT Pub. No.: WO97/40346

PCT Pub. Date: Oct. 30, 1997

(30) Foreign Application Priority Data

Apr. 19, 1996 (DE) ................................................ 196 15 499

(51) Int. Cl.⁷ ............................ G01D 11/28; G01D 13/28
(52) U.S. Cl. .................. 116/288; 116/286; 116/DIG. 36
(58) Field of Search ...................... 116/288, 286, 116/287, 289, DIG. 36, 56, 57, 62.1, 284, 303, DIG. 5, DIG. 6; 174/135

(56) References Cited

U.S. PATENT DOCUMENTS

| | | | |
|---|---|---|---|
| 2,792,803 | * 5/1957 | Hardesty | 116/286 |
| 4,163,428 | * 8/1979 | Ishikawa | 116/288 |
| 4,249,056 | * 2/1981 | MacManus | 200/1 B |
| 4,607,154 | * 8/1986 | Mills | 219/505 |
| 4,747,456 | * 5/1988 | Kitagawa et al. | 177/211 |
| 4,954,807 | * 9/1990 | Fleischer et al. | 340/459 |
| 5,142,453 | * 8/1992 | Ohta et al. | 362/29 |
| 5,222,803 | 6/1993 | Kraus | 362/226 |
| 5,254,968 | * 10/1993 | Zirnheld | 338/50 |
| 5,319,527 | * 6/1994 | Murphy et al. | 362/26 |
| 5,636,589 | * 6/1997 | Kato et al. | 116/286 |
| 5,697,322 | * 12/1997 | Hay et al. | 116/286 |
| 5,747,743 | * 5/1998 | Kato et al. | 174/254 |
| 5,797,345 | * 8/1998 | Evans II, et al. | 116/286 |

FOREIGN PATENT DOCUMENTS

| | | |
|---|---|---|
| 4129057 | 3/1993 | (DE) . |
| 2004065 | 3/1979 | (GB) . |

* cited by examiner

*Primary Examiner*—Diego Gutierrez
*Assistant Examiner*—R. Alexander Smith
(74) *Attorney, Agent, or Firm*—Martin A. Farber

(57) ABSTRACT

A pointer instrument having a connecting sleeve (3) which holds an essentially transparent pointer (4), and an illuminating means (10) that radiates directly into a flag (12) of the pointer (4), the connecting sleeve (3) having conductors (17, 18) and contact surfaces (15, 16) of conductive plastic. At its end facing away from the pointer (4), the connecting sleeve (3) has connecting contacts (13, 14) for making contact with a power supply of a circuit board (6).

3 Claims, 3 Drawing Sheets

POINTER INSTRUMENT

FIELD AND BACKGROUND OF THE INVENTION

The invention relates to a pointer instrument having a pointer shaft that deflects an essentially transparent pointer, having an illuminating means that radiates directly into a flag of the pointer and, having a carrier which is fastened to the pointer shaft. The carrier holds the pointer and has contact surfaces for making contact with the illuminating means, having a connecting sleeve that has connecting contacts for a connection to a power supply, and having conductors to connect the connecting contacts and the contact surfaces.

Such a pointer instrument, in which the illuminating means, together with the pointer, is fastened to the carrier and radiates directly into the pointer flag, is known. In the case of the known pointer instruments, the carrier has an electrically conductive inner body that is connected to one pole of the illuminating means, and an electrically conductive outer body that is connected to the other pole of the illuminating means, the inner body and outer body being separated from each other by insulation. The connecting sleeve has an inner body, which is connected to the pointer shaft, and an outer body, these being separated from each other by an insulation layer and each having connecting contacts. The power is supplied to the connecting contacts of the connecting sleeve through two spiral spring strips, which are constructed in the manner of a sandwich with the interposition of an insulating layer. The inner body and the outer body of the connecting sleeve are each connected to one of the spring strips. The electrical connection between the carrier and the connecting sleeve is achieved via the pointer shaft and via a compression spring arranged between the outer bodies of the carrier and of the connecting sleeve.

The disadvantage with such a pointer instrument is that the connecting sleeve and the carrier consist of very many components, which are complicated to produce and to assemble. Furthermore, there is an unnecessarily large number of contact points between the power supply and the illuminating means, and these impair the functional reliability of the pointer instrument. Since the compression spring forces the carrier and the connecting sleeve away from each other, these must be connected particularly firmly to the pointer shaft, in order to ensure the permanent supply of electric power to the illuminating means.

SUMMARY OF THE INVENTION

The object of the invention is to provide a pointer instrument of the type mentioned at the beginning in such a way that it is simply constructed and has a particularly high functional reliability.

According to the invention, this problem is solved by the connecting sleeve forming the carrier at its end facing the pointer, by the conductors running continuously from the connecting contacts to the contact surfaces, and by the connecting sleeve being produced from a nonconductive plastic and the conductors, the contact surfaces and the connecting contacts being produced from conductive plastic.

According to the invention the novel pointer instrument is particularly simply constructed. Power supply to the illuminating means is thus no longer carried out, as in the case of the known pointer instrument, via the pointer shaft, which is generally produced from metal, or via the compression spring, but rather via the conductors which run continuously from the connecting contacts to the contact surfaces. In this manner, the number of contact points is kept as small as possible, which increases the functional reliability of the novel pointer instrument. The use of electrically conductive plastic contributes to the functional reliability of the pointer instrument, since electrically conductive plastic is not permanently covered by an electrically insulating oxide layer, as is the case with metal, for example. A further advantage of the connecting sleeve is that it has a particularly low weight, so that it does not hamper the movement of the pointer as a result of its mass moment of inertia. The connecting sleeve can be produced, for example, completely by plastic injection molding, so that subsequent assembly is dispensed with. As a result, the connecting sleeve is configured particularly cost-effectively.

The novel pointer instrument can be assembled very simply if the connecting contacts are designed as plug-in contacts. In this way, the connecting sleeve is simply plugged onto the pointer shaft for the purpose of assembly.

The connecting sleeve is configured in a particularly space-saving manner and at the same time has a good mechanical connection to the pointer if, according to an advantageous feature of the invention, it is of mushroom-like configuration and holds the pointer with its cap region.

The illuminating means could be, for example, an incandescent filament. However, the illuminating means has a particularly low energy consumption and is able to illuminate the pointer well if it is an LED chip. Furthermore, such an LED chip has a particularly long service life, as compared with other illuminating means, so that exchange of the illuminating means during the service life of the pointer instrument only has to be carried out infrequently, if at all.

The pointer flag is particularly well illuminated, without the outlay in terms of assembly for the pointer instrument being increased, if, according to an advantageous feature of the invention, reflectors of electrically conductive plastic are arranged at that end of the connecting sleeve which faces the pointer, and if at least two reflectors are designed as contact surfaces for making contact with the illuminating means.

The illuminating means can be exchanged easily if, according to another advantageous feature of the invention, the connecting sleeve has, at its end facing the pointer, a mount which is upright, of C-shaped cross section, open at the top and in the direction of the pointer flag and has contact surfaces arranged in it, and if the illuminating means is arranged on a circuit board which is designed to be pushed into the mount. In this manner, the connecting sleeve may be produced as a standard component for different pointer instruments which are intended to have pointers that have different brightnesses or various colors.

In order to set the brightness, in particular of light-emitting diodes, the latter are often preceded by balancing resistors. These balancing resistors are configured very simply if a planar balancing resistor is applied to the surface of the connecting sleeve. Such a planar balancing resistor may be removed, for example using a laser beam, until the desired resistance value and hence the desired brightness of the illuminating means has been reached.

Typically the pointer of the novel pointer instrument pivots only over a range of 120° to 270°. In this case, the electrical connection between the connecting sleeve and the power supply is particularly simply configured, according to another advantageous feature of the invention, if the connecting sleeve has sinuous wires of conductive plastic that are injection molded on. By virtue of the sinuous shape, the wires can be bent and stretched easily, whereby the movement of the pointer shaft is not impeded.

According to another advantageous feature of the invention, contact is made between the connecting sleeve and the power supply in a particularly space-saving manner if a bifilar helical spring with a low spring force is soldered onto the connecting contacts of the connecting sleeve.

In the case of pointers that pivot over a particularly large range, contact may be made with the connecting sleeve, as in the known pointer instrument, using spiral springs, which would then have to be soldered or plugged onto the connecting sleeve. These spiral springs either could have a particularly low spring force or could be arranged in pairs and in opposite directions. However, contact is made between the connecting sleeve and the power supply very simply if the pointer instrument has a flexible, spiral sheet with conductor tracks printed on it, and the conductor tracks are soldered or clamped to the power supply and to the connecting contacts of the connecting sleeve. Such a sheet can be produced particularly cost-effectively, and has a barely perceptible spring force.

According to another advantageous feature of the invention, contact is made between the connecting sleeve and the power supply very simply if a strip of a heat-seal sheet with conductor tracks printed on it is arranged between the connecting sleeve and the power supply, the heat-seal sheet being swept in a U shape between the power supply and the connecting sleeve when the pointer is in a basic position. By the heat-seal sheet being heated and pressed simultaneously onto the connecting contacts of the connecting sleeve and of the power supply, this sheet is fastened and, at the same time, contact is made with it.

According to another advantageous feature of the invention, the connecting sleeve is quick to assemble and disassemble if the connecting sleeve has slip rings extending around its circumference at different heights, against which prestressed contact springs rest, these springs being connected to the lower supply of the pointer instrument. Since in this case the number of slip rings is limited only by the dimensions of the connecting sleeve, it is possible here to insert a plurality of illuminating means very easily and to activate them differently. For example, a plurality of illuminating means of different colors can be inserted, and the pointer can, in different states, be illuminated in different colors.

The connecting sleeve has no mechanical connection to the power supply of the pointer instrument if the connecting sleeve has a first coil, which is located opposite a second coil of the pointer instrument, the second coil being designed to set up a magnetic field and to generate an electric current in the first coil. This configuration is particularly advantageous in the case of pointers which are intended to have the lowest possible inherent damping. Furthermore, in this case the risk of contamination of slip rings or of breakage of springs and sheets is ruled out.

BRIEF DESCRIPTION OF THE DRAWINGS

With the above and other objects and advantages in view, the present invention will become more clearly understood in connection with the detailed description of preferred embodiments, when considered with the accompanying drawings, of which.

PREFERRED EMBODIMENTS

Figure 1:
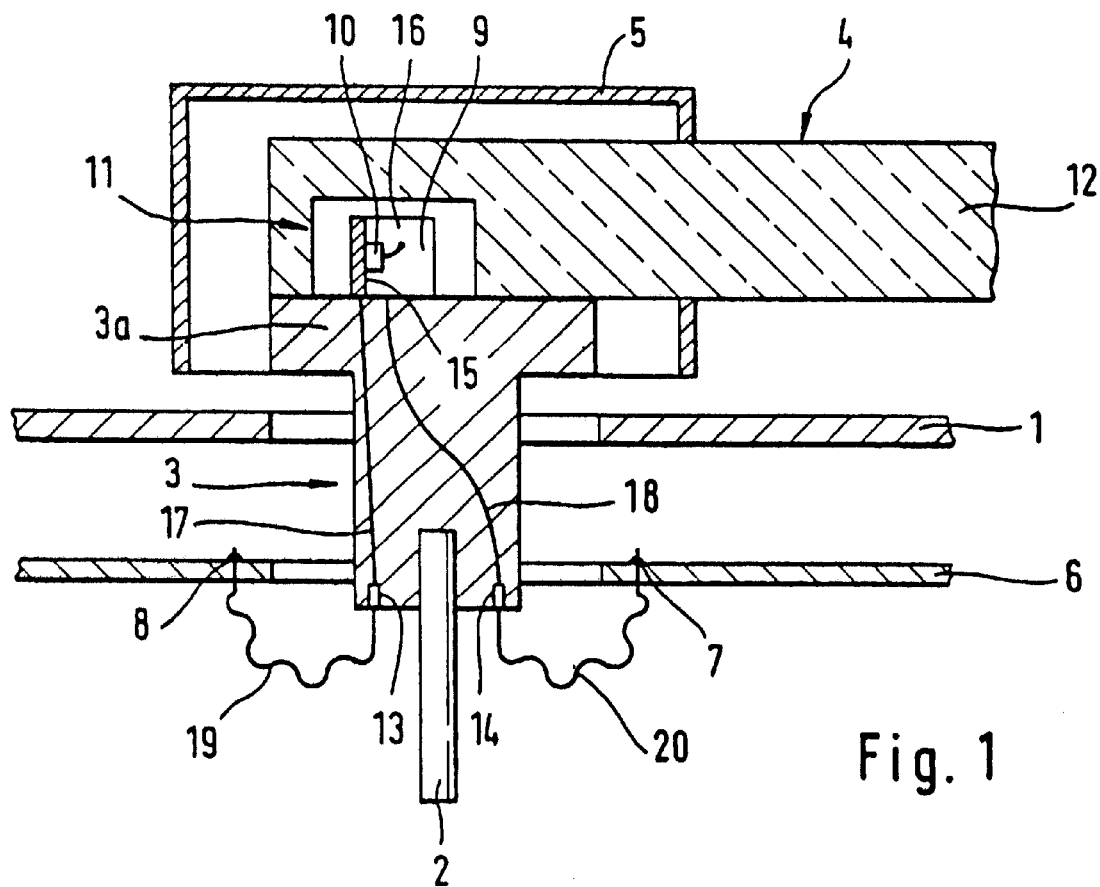
FIG. 1 shows a sectional illustration through an upper region of a novel pointer instrument having a pointer fastened to a connecting sleeve.

FIG. 1 shows a detail from a pointer instrument having a dial face 1, which is penetrated by a connecting sleeve 3 that is plugged onto a pointer shaft 2. Fastened to the connecting sleeve 3 is a pointer 4. The connecting sleeve 3 forms a carrier 3a at an end of the sleeve 3 facing the pointer 4. In the region of the connecting sleeve 3, the pointer 4 has a cap 5 made of an opaque material. Arranged underneath the dial face 1 is a circuit board 6 having contacts 7, 8 for a power supply. Located on the upper side of the connecting sleeve 3 is an upright reflector 9 having an illuminating means 10, these projecting into a recess 11 in the pointer 4. The reflector 9 and the illuminating means 10 are aligned such, that light radiated by them is radiated directly into a flag 12 of the pointer 4.

The connecting sleeve 3 is produced from nonconductive plastic and has conductors 17, 18 of conductive plastic which run continuously from connecting contacts 13, 14 on its underside to contact surfaces 15, 16 on its upper side. In order to supply the illuminating means with electrical power, sinuous wires 19, 20 of conductive plastic are injection molded onto the connecting contacts 13, 14 of the connecting sleeve 3. While the wires 19, 20 are portrayed as hanging loose in FIG. 1, it is to be understood that, by way of alternative embodiment, they may be configured in helical form, as will be described for the conductor tracks 28, 29 in FIG. 3, in which case the wires 19, 20 serve as a bifilar helical spring with a low spring force wherein the wires 19, 20 would be soldered onto the connecting contacts 13, 14 of the connecting sleeve 3 as shown in FIG. 1.

Figure 2:
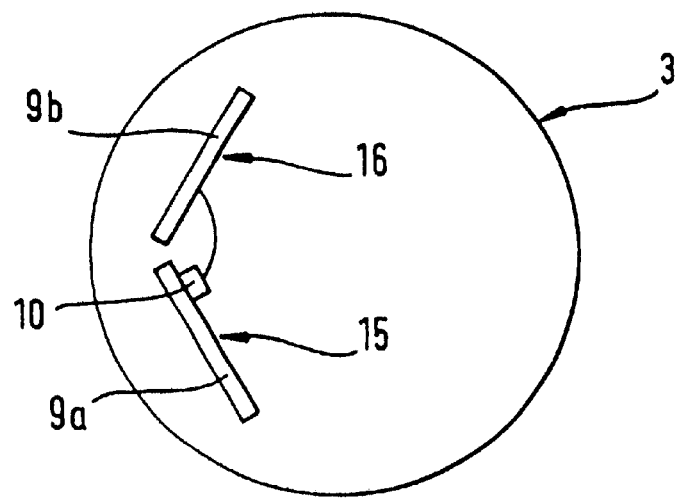
FIG. 2 shows a plan view of the connecting sleeve from FIG. 1.

FIG. 2 shows the connecting sleeve 3 of FIG. 1 from above. It can be clearly seen here that two reflectors 9a, 9b are arranged on the connecting sleeve 3 and at the same time constitute contact surfaces 15, 16 for the illuminating means 10. In this case, the illuminating means 10 is an LED chip bonded onto the reflectors 9a, 9b.

Figure 3:
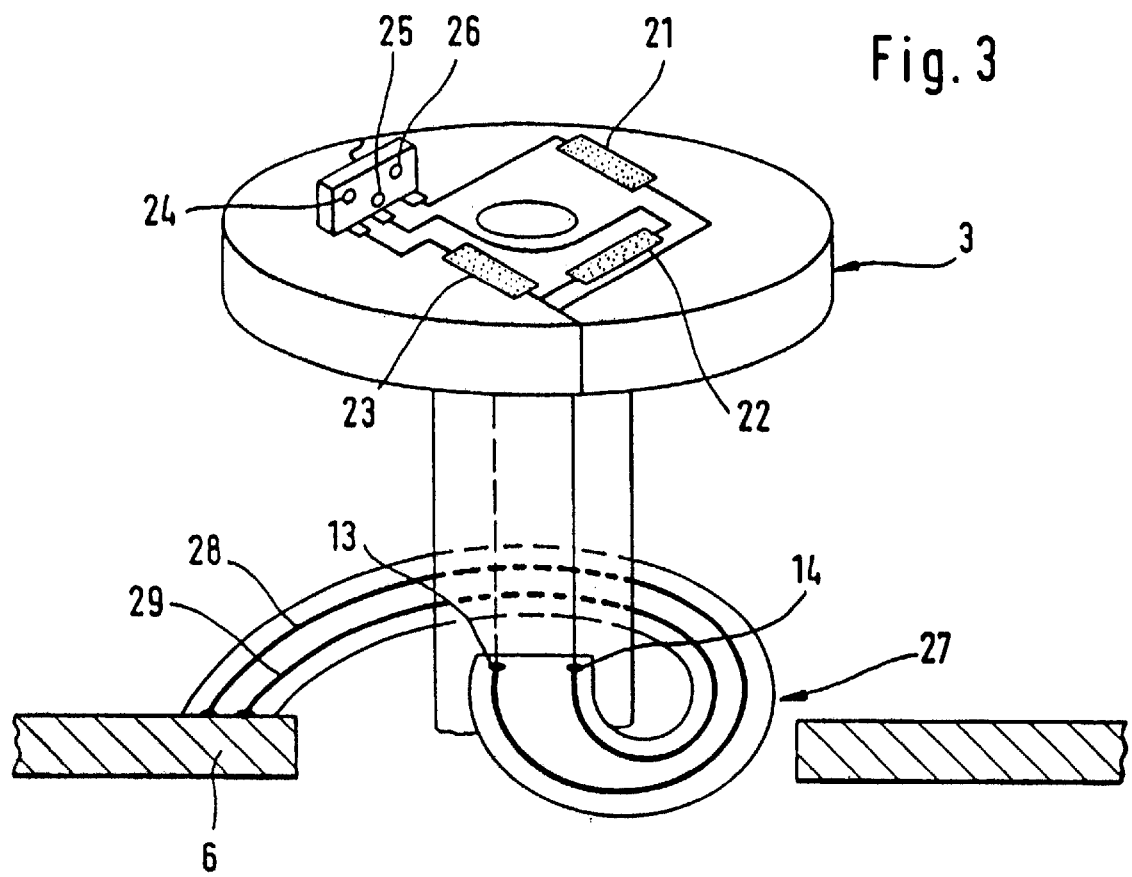
FIG. 3 shows a connecting sleeve with balancing resistors arranged on it.

FIG. 3 shows a plurality of balancing resistors 21–23 which are applied to the upper side of the connecting sleeve 3 and are each connected to an illuminating means 24–26. The balancing resistors 21–23 can be changed by material removal by means of a laser beam, so that in this way uniform brightness of the illuminating means 24–26 may be set. The connecting contacts 13, 14 of the connecting sleeve 3 are soldered to conductor tracks 28, 29 printed onto a flexible, spiral sheet 27. The other end of the sheet 27 is connected to the circuit board 6 to provide a power supply.

Figure 4:
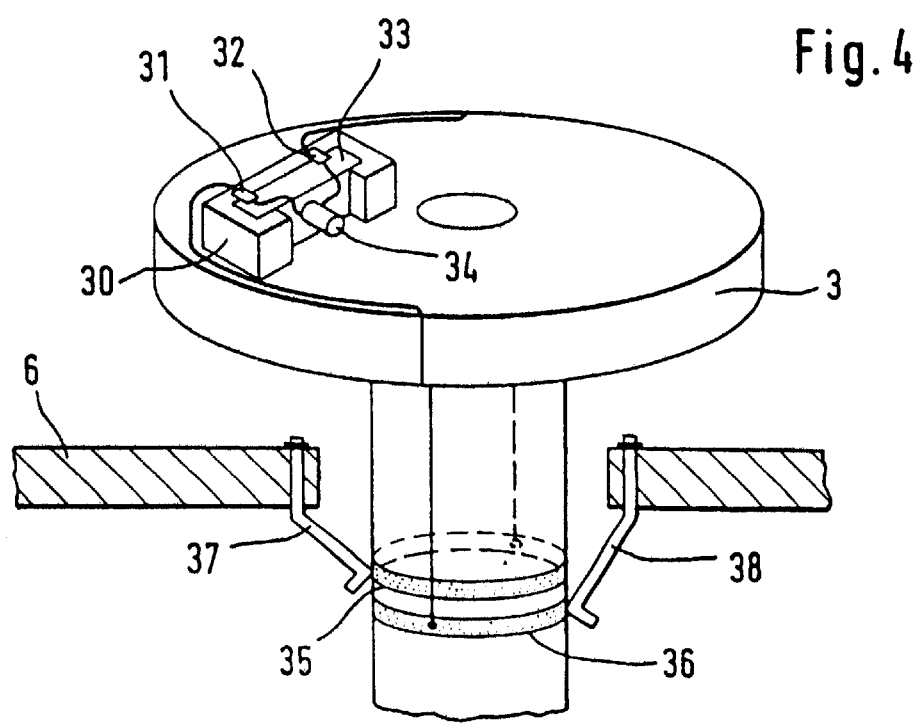
FIG. 4 shows a connecting sleeve having a mount for an illuminating means fastened to a circuit board.

In FIG. 4, the connecting sleeve 3 has, at its end facing the pointer illustrated in FIG. 1, a mount 30 which is upright, of C-shaped cross section and has contact surfaces 31, 32 machined into it. This mount 30 is designed to accommodate an illuminating means 34 arranged on a circuit board 33. The circuit board 33 is pushed into the mount 30 and, at the same time, contact is made with the contact surfaces 31, 32 in the connecting sleeve 3. The electrical connection between the connecting sleeve 3 and the power supply is carried out via slip rings 35, 36 that encircle the connecting sleeve 3, and against which rest contact springs 37, 38 which are fastened to the circuit board 6.

Figure 5:
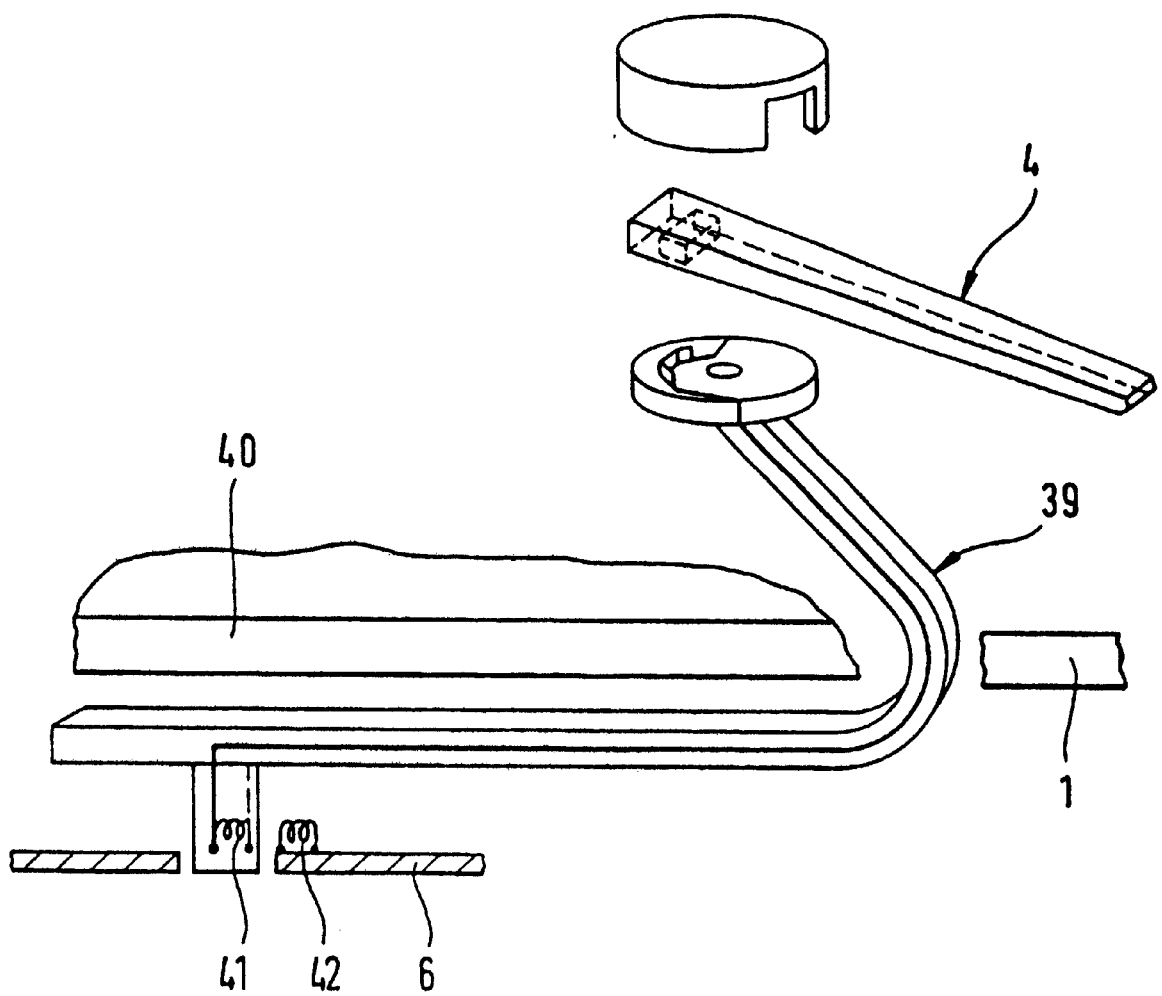
FIG. 5 shows a sectional illustration through an upper region of a pointer instrument having a bent-over connecting sleeve.

FIG. 5 shows a bent-over connecting sleeve 39, which, at its end facing the pointer 4 is configured as described in FIG.

1. As a result of using the bent-over connecting sleeve 39, it is possible for an LCD screen 40 to be arranged in a radially inner region of the pointer instrument, while the dial face 1 is located in a radially outer region. Electric power to the illuminating means 10 illustrated in FIG. 1 is supplied via a first coil 41, arranged in the connecting sleeve 39, and a second coil 42, arranged on the circuit board 6. These coils 41, 42 are arranged opposite each other, so that the electric power is transmitted by induction from the second coil 42 to the first coil 41.

What is claimed is:

1. A pointer instrument comprising:

a pointer shaft;

an essentially transparent pointer having a flag, and being deflectable by rotation of the shaft;

illuminating means that radiates directly into the flag of the pointer;

a connecting sleeve interconnecting the shaft with the pointer, wherein a part of the sleeve facing the pointer is formed as a carrier, the sleeve having connecting contacts for a connection to a power supply and being secured to the pointer shaft, the carrier holding the pointer and having contact surfaces for establishing contact with the illuminating means;

electrical conductors extending along the sleeve from the connecting contacts to the contact surfaces; and wherein the connecting sleeve is made of nonconductive plastic; and wherein the conductors, the contact surfaces and the connecting contacts are made of conductive plastic, and serve to provide electric power to the illuminating means; and further comprising reflectors of electrically conductive plastic located at the end of the connecting sleeve which faces the pointer, and wherein at least two of the reflectors serve as the contact surfaces for providing contact with the illuminating means.

2. A pointer instrument comprising:

a pointer shaft;

an essentially transparent pointer having a flag, and being deflectable by rotation of the shaft;

illuminating means that radiates directly into the flag of the pointer;

a connecting sleeve interconnecting the shaft with the pointer, wherein a part of the sleeve facing the pointer is formed as a carrier, the sleeve having connecting contacts for a connection to a power supply and being secured to the pointer shaft, the carrier holding the pointer and having contact surfaces for establishing contact with the illuminating means;

electrical conductors extending along the sleeve from the connecting contacts to the contact surfaces; and wherein the connecting sleeve is made of nonconductive plastic; and wherein the conductors, the contact surfaces and the connecting contacts are made of conductive plastic, and serve to provide electric power to the illuminating means; and further comprising a circuit board, and wherein the connecting sleeve has, at the end facing the pointer, a mount which is upright, of C-shaped cross section, is open at the top and in the direction of the pointer flag, the mount having the contact surfaces arranged therein, and wherein the illuminating means is arranged on the circuit board, the circuit board being sized and shaped to fit into the mount.

3. A pointer instrument comprising:

a pointer shaft;

an essentially transparent pointer having a flag, and being deflectable by rotation of the shaft;

illuminating means that radiates directly into the flag of the pointer;

a connecting sleeve interconnecting the shaft with the pointer, wherein a part of the sleeve facing the pointer is formed as a carrier, the sleeve having connecting contacts for a connection to a power supply and being secured to the pointer shaft, the carrier holding the pointer and having contact surfaces for establishing contact with the illuminating means;

electrical conductors extending along the sleeve from the connecting contacts to the contact surfaces; and wherein the connecting sleeve is made of nonconductive plastic; and wherein the conductors, the contact surfaces and the connecting contacts are made of conductive plastic, and serve to provide electric power to the illuminating means; and further comprising a strip of a heat-seal sheet with conductor tracks printed thereon, wherein the heat-seal sheet is arranged between the connecting sleeve and the power supply, the heat-seal sheet being swept in a U-shape between the power supply and the connecting sleeve.

* * * * *